United States Patent [19]

Chang

[11] 3,959,201

[45] May 25, 1976

[54] HIGH SOLIDS, WATER THINNABLE COMPOSITIONS

[75] Inventor: Wen-Hsuan Chang, Gibsonia, Pa.

[73] Assignee: PPG Industries, Inc., Pittsburgh, Pa.

[22] Filed: Oct. 11, 1973

[21] Appl. No.: 405,713

Related U.S. Application Data

[63] Continuation-in-part of Ser. No. 301,034, Oct. 26, 1972.

[52] U.S. Cl. ............................ 260/29.4 R; 260/850; 260/851

[51] Int. Cl.² ........................................ C08L 61/28

[58] Field of Search ................ 260/850, 29.4 R, 851

[56] References Cited

UNITED STATES PATENTS

| | | | |
|---|---|---|---|
| 3,267,174 | 8/1966 | Fry et al. | 260/851 |
| 3,311,581 | 3/1967 | Pink | 260/851 |
| 3,352,806 | 11/1967 | Hicks | 260/856 |
| 3,449,467 | 6/1969 | Wynstra | 260/850 |
| 3,539,485 | 11/1970 | Giess et al. | 260/850 X |
| 3,542,718 | 11/1970 | Davis et al. | 260/849 |
| 3,650,996 | 3/1972 | Guldenpfennig | 260/29.4 R X |
| 3,668,276 | 6/1972 | Reimhofer | 260/29.4 R X |

FOREIGN PATENTS OR APPLICATIONS

| | | |
|---|---|---|
| 1,128,450 | 9/1968 | United Kingdom |
| 1,129,895 | 10/1968 | United Kingdom |
| 1,141,515 | 1/1969 | United Kingdom |
| 1,232,098 | 5/1971 | United Kingdom |
| 1,272,070 | 4/1972 | United Kingdom |
| 1,284,280 | 8/1972 | United Kingdom |

*Primary Examiner*—Donald E. Czaja
*Assistant Examiner*—S. M. Person
*Attorney, Agent, or Firm*—William J. Uhl

[57] ABSTRACT

High solids, aqueous solvent-thinnable compositions are prepared by combining relatively low molecular weight, hydroxyl-containing organic materials with aminoplast resins. In general, the hydroxyl-containing materials are characterized by a room temperature water thinnability of 3 or more parts of water per 100 parts of organic material. The compositions can be used in a wide variety of different applications, and find particular utility in the formulation of unique coating compositions.

19 Claims, No Drawings

HIGH SOLIDS, WATER THINNABLE COMPOSITIONS

CROSS-REFERENCE TO RELATED APPLICATION

This application is a continuation-in-part of U.S. application Ser. No. 301,034, filed Oct. 26, 1972.

BACKGROUND OF THE INVENTION

In recent years, the coatings industry has become increasingly interested in high solids coatings, i.e., coatings which can be applied by conventional techniques without the necessity of high amounts of organic solvents. The use of high solids coatings presents several advantages, including high film build per application, economy of materials since organic solvents will normally be lost to the ambient surroundings, and the diminution of environmental control problems such as treatment of plant effluents to capture or destroy volatile pollutants.

The environmental requirements presently being placed on coating systems have further spurred much research activity in the area of water-based coating systems. It is known to produce water-dilutable polymer systems by preparing polymers which have free carboxylic acid groups which are reacted with amines to form water-dilutable systems. However, the presence of the amine salts creates environmental problems. Additionally, these systems have the disadvantage of requiring a large amount of solvent, including organic cosolvents, again creating ecological problems. Finally the presence of the amine generally causes an undesirable film yellowing and solution instability.

It is also known to provide polymer systems with oxyalkylene groups, as by reacting with an ethylene oxide, in order to enhance the water solubility of the polymer system. These systems form films which contain a large number of water sensitive ether groups, tend to weather badly and are easily swollen by water.

It would thus be highly desirable to combine the two types of coating systems, i.e., high-solids and water-thinnable, to form useful coating compositions. Such a combined system would reduce the total amount of organic solvent needed in the system, and at the same time, would reduce costs and increase ease of handling (e.g., cleaning of application and production equipment and thinning of the coating composition.)

To be a useful coating material, the composition after application must produce under conventional curing conditions a film having at least several of those properties required of coatings, such as adhesion, flexibility, hardness, stain resistance, detergent resistance, solvent resistance, water and humidity resistance, and the like.

SUMMARY OF THE INVENTION

It has now been found that highly desirable high solids, aqueous solvent-thinnable compositions can be prepared by combining hydroxyl-containing organic materials of relatively low molecular weights with aminoplast resins. These compositions do not suffer from many of the disadvantages generally attributable to prior water-thinnable coating compositions and generally possess all of the properties required by coating compositions. The compositions are characterized by a solids content of 65 percent by weight or more preferably 70 percent by weight or more and most preferably 80 percent by weight or more. The organic solvent content generally consists of 90 percent by weight or less, preferably 60 percent by weight or less, and most preferably 20 percent by weight or less, based on total solvent with the balance being water. The materials used generally have average hydroxyl equivalents (with hydroxyl values determined by ASTM Designation E222-67, Method B) between about 40 and about 500, and preferably between about 50 and about 350. By "hydroxyl equivalent" is meant the weight per hydroxyl group. If the material used is of relatively low viscosity, it can usually be thinned by water alone; if, however, the material has a relatively high viscosity, water plus water-compatible organic solvent may be used.

The unique compositions of the instant invention are produced in general by selecting a relatively low molecular weight, hydroxyl-containing organic material having a room temperature water thinnability of 3 or more parts of water, and preferably 6 or more parts of water per 100 parts of organic material. The low molecular weight, hydroxyl-containing organic materials which may be used in the instant invention can be broadly classified as non-nitrogen containing polyols, amide group containing polyols, and hydroxyl-containing acrylates and methacrylates. The term "polyol" is meant to include materials having two or more hydroxyl groups per molecule.

The non-nitrogen containing polyols include diols, triols and higher alcohols, polyester polyol oligomers, and polyester polyol oligomers containing 1 or 2 ether groups per hydroxyl group, and preferably containing no more than 3 and most preferably no more than 2 ether groups per molecule. The amide group-containing polyols in general contain at least one group of the formula:

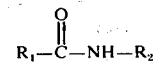

wherein the

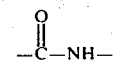

group represents an amide group, wherein $R_1$ is selected from the group consisting of —$CH_2$-, >CH—,

—O—, >N—, —$NH_2$, and —NH—, and wherein $R_2$ is selected from the group consisting of —$CH_2$—, >CH,

—O—,

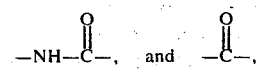

including such materials as polyurethane polyol oligomers, cyclic nitrogen compounds, polyurea polyol oligomers and polyamide polyol oligomers. The hydroxyl containing acrylates usable in the instant invention include essentially any hydroxyl-containing acrylate, methacrylate or oligomer thereof. When using acrylates and methacrylates, some free radical catalyst is generally required.

The compositions disclosed herein can be used in a wide variety of different applications, and find particular utility as coating compositions. Some of the advantages of such coating compositions include low cost, excellent salt spray resistance, good hardness and detergent resistance.

DETAILED DESCRIPTION OF THE INVENTION

The instant invention is directed to aqueous high solids compositions comprising (A) low molecular weight hydroxyl-containing organic materials having room temperature water thinnability of 3 parts or more of water per 100 parts of organic material, (B) aminoplast resins, and (C) aqueous solvent, wherein at least 10 percent by weight of the solvent is water. By "water thinnability" is meant that the polyol is compatible with that amount of water.

While the exact reasons why the particular organic materials disclosed herein form effective high solids, water-thinnable coating compositions when combined with aminoplast resins are not entirely understood, certain factors seem to influence the effectiveness of the materials usable herein. The material should be of relatively low molecular weight. The water-thinnability appears to be affected by the hydroxyl content, the nitrogen content, and the oxygen content as in ether and carbonyl groups. As the content of any one of these materials increases, an increase in water thinnability is generally observed. In general, high water solubility is not desirable because it often causes an undesirable water sensitivity of the film.

Molecular weight appears to affect the thinnability with relatively low molecular weight materials exhibiting high water thinnability. The organic material should not be highly crystalline, nor should it have a high carbon ring content, sine both factors tend to adversely affect the water thinnability. It has also been found that materials with oxygen plus nitrogen to carbon ratios (i.e., $\frac{O + N}{C}$)

of less than 1 to 5 will not form effective water thinnable compositions.

Although any one of the above-described factors appears to influence the water thinnability, the interaction among any two or more factors is generally difficult to predict with certainty.

As noted above, the low molecular weight, hydroxyl-containing materials usable in the instant invention can be broadly classified as non-nitrogen containing polyols, amide group-containing polyols and hydroxyl-containing acrylates.

The average hydroxyl equivalent of the polyol used must be above about 40 and below about 500, and preferably is above about 50 and below about 350.

The non-nitrogen containing polyols useful in the instant invention include diols, triols and higher alcohols, polyester polyol oligomers, and polyester polyol oligomers containing one or two alkylene oxide groups per hydroxyl group and preferably containing no more than three alkylene oxide groups per molecule.

The diols, triols and higher alcohols useful in the instant invention are known in the art. Such materials include ethylene glycol, 1,2-propane diol; 1,3-propane diol; 1,2-butane diol; 1,3-butanediol; 1,4-butanediol; 2,3-butane diol; 1,6-hexane diol; 2,4-pentanediol; 1,5-pentanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,2-cyclohexanediol; 1,4-cyclo hexane diol; 1,2-bis(hydroxymethyl)cyclohexane; 2,2-diethylpropane diol-1,3; 2,2-diethylbutanediol-1,3; butene-2-diol-1,4; trimethylolpropane; trimethylolethane; glycerol; 1,2,4-butane triol; 1,2,6,hexane-triol; erythritol, D-threitol; L-threitol; sorbitol; D-mannitol; diglycerol; Ester Diol 204 (2,2-dimethyl-3-hydroxypropyl 2,2-dimethyl-3-hydroxypropionate); diethylene glycol; triethylene glycol; dipropylene glycol; tetraethylene glycol; 2,2-bis(hydroxyethoxyphenyl)propane; 2,2-bis(bethahydroxypropoxyphenyl)propane; cyclohexyl dimethanol; cyclohexane diol; and the like.

Also useful are the low molecular weight reaction products of alkylene carbonates and any of the above-described diols, triols, and higher alcohols as described in U.S. Pat. Nos. 3,248,414; 3,248,415; 3,248,416; and 3,689,462; the disclosures of which are herein incorporated by reference.

The polyester polyol oligomers useful in the instant invention generally have molecular weight less than or equal to about 800 and are produced by conventional techniques utilizing any of the above-described diols, triols, and higher alcohols with any of the various known dicarboxylic acids. Suitable acids include phthalic, isophthalic, terephthalic, tetrahydrophthalic, hexahydrophthalic, adipic, azelaic, sebacic, malic, glutaric, chlorendic, tetrachlorophthalic, maleic, fumaric, itaconic, malonic, pimelic, suberic, 2-methylsuccinic, 2,3-dimethyl succinic, 3,3-diethyl glutaric, 3,3-dimethyl glutaric, 2,2-dimethyl glutaric, 2,2-dimethyl succinic and the like. Anhydrides of these acids, where they exist, can also be employed and are encompassed by the term "dicarboxylic acid". Finally, certain materials which react in a manner similar to acids to form polyester polyols are also useful. Such materials include lactones such as caprolactone, propyolactone, and methyl caprolactone, and hydroxy acids such as tartaric acid. If a triol or higher alcohol is used, a monocarboxylic acid, such as acetric acid, may be used to form the polyester polyol oligomer, and for some purposes, such a composition would be highly desirable.

It is preferred that the polyester polyol oligomers contain from 1 to 4 ester groups and for such purpose an equivalent ratio of hydroxyl groups to carboxyl groups of greater than 1 should be used. Such polyester polyol oligomers may be produced by any of the methods known in the art. In general, the polyester polyol should have an average functionality of 2 or more. By "functionality" is meant the number of reactive hydroxyl or carboxyl groups per molecule.

It is noted that certain of the materials useful in the instant invention, while water thinnable, will crystallize after a short time. Such materials (e.g., the polyester oligomer formed from ethylene glycol and succinic acid) in general, need merely be heated before application in order to form useful coating compositions.

Where desired, it is also possible to produce polyester polyol oligomers containing one or two alkylene oxide groups per hydroxy group and preferably no more than three alkylene oxide groups per molecule.

Such oligomers will generally have molecular weights of 1000 or less. In general, the alkylene oxide containing polyester can be produced by substituting an alkylene oxide containing polyol for all or part of the polyol component used to produce the polyester. Useful alkylene oxide containing polyols include diethylene glycol, triethylene glycol, dipropylene glycol, tetraethylene glycol, 2,2-bis(hydroxyethylphenyl) propane, 2,2-bis(-beta-hydroxypropoxyphenyl)propane and the like. The polyesters produced using alkylene oxide containing polyols can be made by any of the conventional techniques, care being taken to insure that the polyester oligomer produced contains no more than 2 alkylene oxide groups per hydroxyl group and preferably no more than three alkylene oxide groups per molecule. These polyester polyols may also be produced by oxyalkylating any of the above-described polyester polyols (i.e., reacting a polyester polyol with an alkylene oxide). The amounts of oxyalkylene groups present on the molecule should be carefully controlled in order to produce a film having no, or minimal, adverse weathering affects.

The second important class of low molecular weight hydroxyl-containing organic materials are the amide group-containing polyols. The nitrogen containing polyols will generally contain at least one group of the formula:

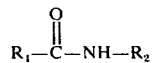

wherein the

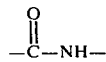

group represents an amide group, wherein $R_1$ is selected from the group consisting of —CH$_2$—, >CH—,

—O—, —NH$_2$— and —NH—, and wherein $R_2$ is selected from the group consisting of —CH$_2$—, >CH—,

—O—,

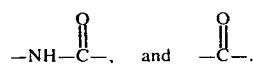

Included are such materials as polyurethane polyol oligomers, cyclic nitrogen compounds, polyurea polyol oligomers and polyamide polyol oligomers.

The polyurethane polyol oligomers useful in the instant invention contain no more than 4 urethane groups per molecule. In general, where no ether groups are present, the molecular weights will be 800 or less. Where, however, one or two oxyalkylene groups per hydroxy group and preferably no more than 3 oxyalkylene groups per molecule are present, the molecular weight may go as high as 1000. The polyurethane polyol oligomers useful in the instant invention are produced by reacting any of the above-described polyols, including diols, triols and higher alcohols, ether-containing polyols, polyester polyol oligomers and polyester polyol oligomers containing alkylene oxide groups as herein before described with an organic polyisocyanate.

The polyisocyanate which is reacted with the polyol can be essentially any organic polyisocyanate, e.g., hydrocarbon polyisocyanates or substituted hydrocarbon polyisocyanates. Many such organic polyisocyanates are known in the art, including p-phenylene diisocyanate, biphenyl diisocyanate, toluene diisocyanate, 3,3'-dimethyl-4,4'-diphenylene diisocyanate, 1,4-tetramethylene diisocyanate, hexamethylene diisocyanate, 2,2,4-trimethylhexane-1,6-diisocyanate, methylene-bis(phenylisocyanate), lysine methyl ester diisocyanate, bis(isocyanatoethyl)fumarate, isophorone diisocyanate and methyl cyclohexyl diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis-(isocyanatocyclohexyl)methane, 1,4-butylene diisocyanate, methylcyclohexyl diisocyanate, and isophorone diisocyanate.

The conditions of the reaction between the polyol and the polyisocyanate are chosen so as to produce an hydroxyl-containing urethane reaction product of low molecular weight, i.e., a polyurethane polyol oligomer. In general, this is accomplished by utilizing an equivalent ratio of isocyanate groups to hydroxyl groups of less than about one, and allowing substantially all the isocyanate groups present to react. Similarly, the amounts of reactants are controlled such that the polyurethane polyol oligomer contains no more than 4 urethane groups per molecule.

Optionally, the polyurethane polyol oligomer may be produced by reacting an alkylene carbonate (e.g., ethylene carbonate) with aminoalcohols or amines as described in U.S. Pat. Nos. 3,248,414; 3,248,415; 3,248,416; and 3,689,462; the disclosures of which are herein incorporated by reference.

Suitable cyclic nitrogen-containing polyols include such compounds as tris(hydroxyethyl)isocyanurate (THEIC).

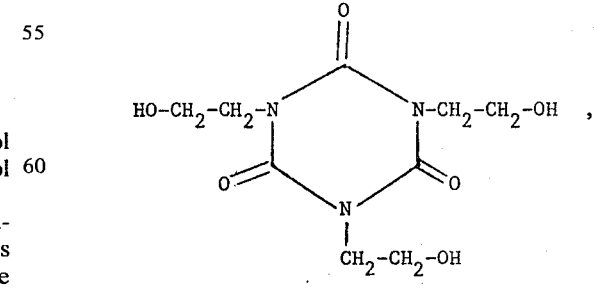

N,N'-bis(hydroxyethyl)dimethyl hydantoin (BHDH)

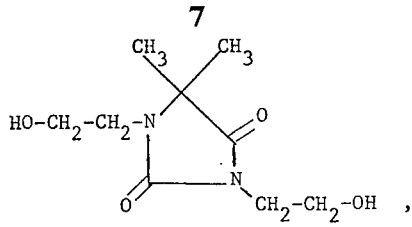

1,4-bis[4,4-bis(hydroxymethyl)-1,3-oxazol-2-ene-2-yl]butane [formed from one mole of adipic acid and 2 moles of $NH_2-C-(CH_2OH)_3$]

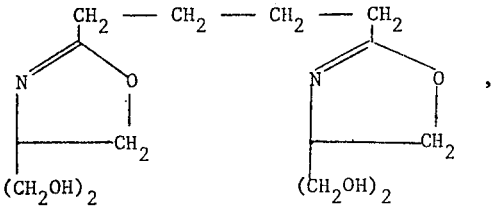

hydroxyalkylated THEIC, hydroxyalkylated BHDH, bis(hydroxyethyl)ethylene urea, 4,4-bis(hydroxymethyl)-1,3-oxazolidin-2-one, and the like.

The cyclic nitrogen-containing polyols may be used by themselves or they may be reacted with any of the above-described acids to form ester groups or with any of the above-described polyisocyanates to form urethane groups. In general, the molecular weights of the cyclic compounds should not exceed 800; however, where the molecule includes one or two alkylene oxide groups per hydroxyl group, and preferably no more than three oxyalkylene groups per molecule, the molecular weight may be as high as 1000.

The polyamide polyol oligomers useful in the instant invention are produced using conventional techniques. In general, such oligomers are produced from any of the above-described diacids or lactones and diols, triols and higher alcohols, and small amounts of diamines or aminoalcohols Optionally useful oligomers may be produced from diacids or lactones and aminoalcohols. Suitable diamines and aminoalcohols include hexamethylene diamine, ethylene diamine, monoethanolamine, phenylenediamines, toluene diamines, diethanolamines and the like. The molecular weights of the polyamide polyols usable in the instant invention are generally equal to or less than 800 where no alkylene oxide groups are present; however, the molecular weights may be as high as 1000 where one or two alkylene oxide groups per hydroxyl group and preferably no more than three oxyalkylene groups per molecule are present.

The polyurea polyol oligomers useful in the instant invention are generally produced by reacting any of the above-described polyisocyanates with either an aminoalcohol such as monoethanolamine or an aminoalcohol and a diol. In general, the molecular weights of the polyurea polyols usable in the instant invention are less than or equal to 800 where no alkylene oxide groups are present. The molecular weights may be as high as 1000 where one or two alkylene oxide groups per hydroxy group, and preferably no more than three oxyalkylene groups per molecule, are present.

The hydroxyl-containing acrylates useful in the instant invention include essentially any hydroxyl-containing acrylate, methacrylate and oligomers thereof. The preferred acrylates are the hydroxyalkyl acrylates and methacrylates in which the alkyl group has up to 12 carbon atoms, such as acrylic acid and methacrylic acid esters of ethylene glycol and 1,2-propylene glycol. Examples include hydroxyethyl acrylate and methacrylate, hydroxypropyl acrylate and methacrylate, as well as polyethylene glycol monoacrylate, hydroxyl containing-polycaprolactone monoacrylate, hydroxybutyl acrylate and hydroxyoctyl methacrylate. As is readily apparent, the hydroxyl-containing acrylates are produced by reacting acrylic and methacrylic acid with essentially any of the diols, triols and higher alcohols, polyester polyol oligomers, polyester polyol oligomers containing alkylene oxide groups, polyols containing alkylene oxide groups, polyamide polyols, polyurethane polyols, and cyclic nitrogen compounds as hereinbefore described. When using acrylates and methacrylates, catalyst is needed for the curing thereof. Examples of useful catalysts include benzyl peroxide, cumyl peroxide, azobisisobutyronitrite, and the like.

In general, the hydroxyl containing acrylates and methacrylates usable in the instant invention will have molecular weights of 800 or less; however, when the molecule includes one or two alkylene oxide groups per hydroxyl group and preferably no more than three oxyalkylene groups per molecule, the molecular weight may be as high as 1000.

It has been found that by reacting any of the described hydroxyl-containing low molecular weight organic materials with certain reactants, the water thinnability can be increased or decreased. Increased water thinnability may be desireable so that the amount of organic solvent necessary may be decreased. However, in many cases, the lowering of the water thinnability is desireable because highly water soluble materials will often produce water sensitive films. Thus, if the hydroxyl containing materials are reacted with urea with the elimination of ammonia or ureido compounds such as dimethylolurea with the elimination of water, the water thinnability will generally increase.

It has also been found that if the hydroxyl-containing materials disclosed herein are reacted with lactones, such as caprolactone, the water thinnability will decrease. Similarly, it has been found that if the hydroxyl-containing material also contains an acetamide group (such as

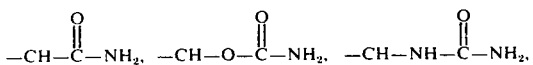

and the like), reaction of such material with an aldehyde (e.g., formaldehyde) increases the water thinnability. In any event, reaction of any of the above reactants will necessarily increase the molecular weights of the hydroxyl containing materials, in some cases above the limits hereinbefore set forth.

It has also been found that the particular polyol chosen should form an homogeneous solution with the aqueous solvent and the curing agent, although if the polyols form an emulsion or solid dispersion with the curing agent, satisfactory results can be obtained. It is preferred that an homogenous solution be formed.

The aminoplast resins employed herein are aldehyde condensation products of melamine, urea, benzoguanamine and the like. They may be water-soluble or they may be organic solvent soluble, although the water soluble aminoplasts are preferred. Generally, the aldehyde employed is formaldehyde, although useful products can be made from other aldehydes such as acetaldehyde, crotonaldehyde, acrolein, benzaldehyde, furfural and the like. Condensation products of melamine, urea and benzoguanamine are the most common and are preferred, but products of other amines and amides in which at least one amino group is present can also be employed.

Such condensation products can be produced from triazines, diazines, triazoles, guanadines, guanamines and alkyl- and aryl-substitutes derivation of such compounds, including alkyl-substituted, aryl-substituted and cyclic ureas, and alkyl and aryl-substituted melamines. Some examples of such compounds are N,N'-dimethyl urea, benzyl urea, N,N'-ethylene urea, diazine diamide, formaguanamine, acetoguanamine, ammeline, 2-chloro-4,6-diamino-1,3,5 triazine, 3,5-diaminotriazole, 4,6-diamino-propyrimidine, 2,4,6-triphenyl-triamino-1,3,5-triazine, and the like.

These aldehyde condensation products may contain methylol groups or similar alkylol groups, depending upon the particular aldehyde employed. Ordinarily, in producing amine-aldehyde condensation products, all or part of these methylol groups are etherified by reaction with an alcohol to produce an alkylated product. In some instances, it is desireable that all or substantially all of the methylol groups be etherified.

Various alcohols can be employed for the etherification of the alkylol groups. These include essentially any monohydric alcohol, with the preferred alcohols being methanol, ethanol, propanol, butanol and other lower alkanols having up to about 5 carbon atoms, including isomers such as 2-methyl-1-propenol. There can also be employed alcohols such as the lower alkyl monoethers of ethylene glycol and the like. Higher alcohols can be used but are less desirable because they tend to affect the film properties of the baked film, and tend to give incompatible solutions when mixed with the polyols in the aqueous solvent.

The aminoplast resins are produced in a manner well known in the art, using acidic or basic catalysts with varying conditions of time and temperature. The aldehyde is often employed as a solution in water or alcohol, with the condensation, polymerization and etherification reactions being carried out either sequentially or simultaneously.

For optimum properties, it is desirable to include in the composition a polymeric polyol having an hydroxy equivalent weight equal to or greater than 200, and preferably equal to or greater than 500. In fact, where the average hydroxyl equivalent weight of the hydroxyl-containing organic material is less than about 40, such as polymeric polyol is required. The inclusion of such a polymeric polyol gives a balance of flexibility and hardness. Among the preferred polymeric polyols are polyether polyols; especially preferred are poly(oxyalkylene)glycols, such as poly(oxyethylene) glycol, poly(oxypropylene)glycol and other such polyols having up to about 6 carbon atoms separating each pair of oxygen atoms such as polyoxyalkylated trimethylolpropane, sorbitol or hexane triol. A specific preferred polyol is poly(oxytetramethylene)glycol. Other highly desirable polymeric polyols are polyester polyols having the desired hydroxy equivalent, especially those produced from acyclic reactants such as adipic acid and azelaic acid and alkylene glycols; poly(diethylene glycol adipate) is a useful example. Still other polymeric polyols of suitable properties include condensates of lactones with polyols, such as the product from caprolactone and ethylene glycol, propylene glycol, trimethylolpropane, and the like.

Also useful are polymeric acrylic polyols having the desired hydroxy equivalent, such as interpolymers of hydroxyalkyl acrylates and methacrylates and large amounts of other copolymerizable materials such as methyl methacrylate, 2-ethylhexyl acrylate, n-butyl acrylate, and the like.

Also useful as the polymeric polyol component are the hydroxyl-containing urethane reaction products of any of the above-described high hydroxyl equivalent polymeric polyols and an organic polyisocyanate.

The polymeric polyols useful in the instant invention are more particularly disclosed in U.S. applications Ser. Nos. 385,262, filed Aug. 3, 1973, 385,263, filed Aug. 3, 1973, and 385,430, filed Aug. 3, 1973.

The polymeric polyol can be incorporated in the composition in various ways. For example, the polymeric polyol may be blended either before or after addition of the aminoplast resin; alternatively, the polymeric polyol may be blended with the aminoplast resin before addition to the composition. If desired and/or necessary, the polymeric polyol may be solubilized in water through the use of amine salts well known in the art.

The proportions of the above components can be varied to provide certain properties. For example, higher levels of polymeric polyol result in somewhat softer and more extensible coatings, whereas harder, more resistant coatings are obtained by increasing the proportion of aminoplast resin. The amounts employed depend in large part upon the nature of the particular components used to produce the composition.

In most cases, the overall compositions contain from about 20 to about 80 percent by weight of low molecular weight organic material and from about 80 to about 20 percent by weight of aminoplast resin. The preferred compositions in which a polymeric polyol is included contain from about 20 to about 75 percent by weight of low molecular weight organic material, from about 25 to about 70 percent by weight of aminoplast resin and up to about 60 percent by weight of polymeric polyol. Where the average hydroxyl equivalent of the low molecular weight material is below about 40, the polymeric polyol must be present in amounts ranging from about 10 percent to about 60 percent by weight.

In general, the aqueous solvent used will comprise at least about 10 percent by weight of water, and preferably at least about 40 percent by weight, and most preferably at least 80 percent by weight, with the balance being a conventional organic solvent which is compatible with water, such as butyl cellosolve, ethanol, butanol, methylethyl ketone, methyl isobutyl ketone, cyclohexanone, acetamide, pyrolidone and combinations thereof. A minor amount (i.e., less than about 5 percent by weight) of water insoluble solvent such as toluene may also be present.

In addition to the components above, the compositions ordinarily contain other optional ingredients, including various pigments of the type ordinarily utilized in coatings of this general class. In addition, various conventional fillers, emulsifiers, plasticizers, antioxidants, flow control agents, surfactants, and other such formulating additives may be added. Finally, the compositions may contain minor amounts of various compounding resins, e.g., silicone resin, to improve the weatherability of the resultant film.

The compositions herein can be applied by any convenient method, including brushing, dipping, flow coating, etc., but they are most often applied by spraying. Usual spray techniques and equipment may be utilized. The compositions can be applied over virtually any substrate, including wood, metals, glass, cloth, plastics, foams, and the like.

The coating compositions herein are generally cured at elevated temperatures. In most cases, the cure schedule is from several seconds to several days at temperatures of from about 70° to about 450°F. Higher or lower temperatures with correspondingly shorter and longer times can be utilized, although the exact cure schedule best employed depends in part upon the nature of the substrate as well as the particular components of the composition. Acid catalysts and other curing catalysts can be added to aid in curing if desired, permitting the use of lower temperature and/or shorter times.

If desired, the low molecular weight organic materials herein may be treated in order to increase the acid value thereof as by incorporating acid groups therein. These acid groups can be neutralized with an amine in a manner well known in the art. However, it is to be noted that the compositions herein are not dependent upon the presence of amine salts for water thinnability.

The invention will be further described in connection with several examples which follow. These examples are given as illustrative of the invention and are not to be construed as limiting it to their details. All parts and percentages in the examples and throughout the specification are by weight unless otherwise indicated. The water thinnabilities are reported in terms of parts of approximate water per 100 parts of resin unless otherwise indicated. The molecular weights are based on the charges of the starting materials.

EXAMPLES 1 THROUGH 20

The low molecular weight polyester polyol oligomers set forth in Table I were tested, and were found to be useful in combination with aminoplast resins to form useful coating compositions. The water thinnability is recorded in terms of parts of water per 100 parts of organic material.

TABLE I

| EXAMPLE | REACTANTS | | | MOLECULAR WEIGHT | MOLE RATIO | WATER THINNABILITY |
|---|---|---|---|---|---|---|
| 1 | Phthalic Acid | Diethylene Glycol | | 342 | 1:2 | 25 |
| 2 | Phthalic Acid | Diethylene Glycol | Urea | 428 | (1:2):2 | 40 |
| 3 | Phthalic Acid | Ethylene Glycol | | 254 | 1:2 | 10 |
| 4 | Phthalic Acid | Ethylene Glycol | Caprolactone | 315 | (1:2):.55 | 20 |
| 5 | Phthalic Acid | Ethylene Glycol | Caprolactone | 383 | (1:2):1.1 | 15 |
| 6 | Phthalic Acid | Ethylene Glycol | Caprolactone Urea | 329 | [(1:2):.28]:1 | 30 |
| 7 | Phthalic Acid | Ethylene Glycol | Caprolactone Urea | 358 | [(1:2):.57]:1 | 25 |
| 8 | Phthalic Acid | Ethylene Glycol | Urea | 340 | (1:2):2 | 50 |
| 9 | Phthalic Acid | Neopentyl Glycol | | 338 | 1:2 | 5 |
| 10 | Adipic Acid | Ethylene Glycol | | 240 | 1:2 | 35 |
| 11 | Adipic Acid | Ethylene Glycol | Propylene Glycol | 254 | 1:1:1 | 30 |
| 12 | Adipic Acid | Ethylene Glycol | Diethylene Glycol | 284 | 1:1:1 | 70 |
| 13 | Adipic Acid | Glycerol | | 314 | 1:2 | 50 |
| 14 | Adipic Acid | Neopentyl Glycol | | 314 | 1:2 | 11 |
| 15 | Succinic Acid | Neopentyl Glycol | | 286 | 1:2 | 17 |
| 16 | Hexahydrophthalic Acid | 1,6-Hexane Diol | | 372 | 1:2 | 8 |
| 17 | Hexahydrophthalic Acid | Phthalic Acid | Ethylene Glycol | 257 | 1:1:4 | 18 |
| 18 | Phthalic Acid | Propylene Glycol | | 246 | 1:2 | 15 |
| 19 | Caprolactone | Trimethylol Propane | | 540 | 3.6:1 | >30 |
| 20 | Caprolactone | Trimethylol Propane | | 300 | 1.4:1 | >30 |

EXAMPLES 21 THROUGH 46

The low molecular weight polyurethane polyol oligomers set forth in Table II were tested, and were found to be useful in combination with aminoplast resins to form useful coating compositions. The water thinnability is reported in terms of parts of water per 100 parts of oligomer.

TABLE II

| EXAMPLE | REACTANTS | | | MOLECULAR WEIGHT | MOLE RATIO | WATER THINNABILITY |
|---|---|---|---|---|---|---|
| 21 | Ethanolamine | Ethylene Carbonate | | 149 | 1:1 | >200 |
| 22 | Ethanolamine | Ethylene Carbonate | Caprolactone | 208 | (1:1):.48 | 190 |
| 23 | Ethanolamine | Ethylene Carbonate | Caprolactone | 217 | (1:1):.6 | 150 |
| 24 | Ethanolamine | Methyl Ethylene Carbonate | Caprolactone | 206 | (1:1):.38 | 190 |
| 25 | Ethanolamine | Methyl Ethylene Carbonate | Caprolactone | 218 | (1:1):.48 | 160 |
| 26 | Diethanolamine | Ethylene Carbonate | | 193 | 1:1 | >200 |
| 27 | Diethanolamine | Ethylene Carbonate | Caprolactone | 387 | (1:1):1.7 | 90 |
| 28 | Diethanolamine | Ethylene Carbonate | Caprolactone | 307 | (1:1):1 | 100 |
| 29 | Diethanolamine | Ethylene Carbonate | Caprolactone | 265 | (1:1):.63 | 400 |
| 30 | Diethanolamine | Ethylene Carbonate | Caprolactone | 257 | (1:1):.47 | >500 |
| 31 | Diethanolamine | Ethylene Carbonate | Caprolactone | 230 | (1:1):.32 | >500 |
| 32 | Diethanolamine | Ethylene Carbonate | Caprolactone | 211 | (1:1):.16 | >500 |
| 33 | Diethanolamine | Ethylene Carbonate | Caprolactone | 347 | (1:1):1.35 | 100 |
| 34 | Diethanolamine | Ethylene Carbonate | Caprolactone | 386 | (1:1):1.70 | 90 |
| 35 | Diethanolamine | Ethylene Carbonate | Caprolactone | 490 | (1:1):2.54 | 50 |
| 36 | Diethylene Triamine | Ethylene Carbonate | Caprolactone | 338 | (1:1.25):1.17 | 90 |
| 37 | Hexamethylene Diisocyanate | Ester Diol 204 | Propylene Glycol | 446 | 5:10:10 | 21 |
| 38 | Hexamethylene Diisocyanate | Ester Diol 204 | Propylene Glycol | 523 | 6.3:8:8 | 15 |

TABLE II-continued

| EXAMPLE | REACTANTS | | MOLECULAR WEIGHT | MOLE RATIO | WATER THINNABILITY |
|---|---|---|---|---|---|
| 39 | Hexamethylene Diisocyanate | Ester Diol 204 | 328 | 1:4 | 15 |
| 40 | Hexamethylene Diisocyanate | Ester Diol 204 | 452 | 1:2.5 | 15 |
| 41 | Isophorone Diisocyanate | Neopentyl Glycol | 428 | 1:2 | 12 |
| 42 | Iosphorone Diisocyanate | Dipropylene Glycol | 512 | 1:2 | 15 |
| 43 | Trimethyl-hexamethylene Diisocyanate | 1,4-Butane Diol | 388 | 1:2 | 11 |
| 44 | Trimethyl-hexamethylene Diisocyanate | Dipropylene Glycol | 500 | 1:2 | 15 |
| 45 | Xylylene Diisocyanate | Dipropylene Glycol | 456 | 1:2 | 24 |
| 46 | Hexamethylene Diisocyanate | Ester Diol 204 | 576 | 1:2 | 24 |

EXAMPLES 47 THROUGH 55

The low molecular weight polyamide polyol oligomers set forth in Table III were tested, and were found to be useful in combination with aminoplast resins to form useful coating compositions. The water thinnability is reported in terms of parts of water per 100 parts of oligomer.

EXAMPLES 56 THROUGH 82

The low molecular weight cyclic nitrogen polyols set forth in Table IV were tested, and were found to be useful in combination with aminoplast resins to form useful coating compositions. The water thinnability is recorded in terms of parts of water per 100 parts of polyol. In the Table, THEIC represents tris(hydroxyethyl)isocyanate, while BHDH represents N,N'-bis(hydroxyethyl)dimethyl hydantoin.

TABLE III

| EXAMPLE | REACTANTS | | | MOLECULAR WEIGHT | MOLE RATIO | WATER THINNABILITY |
|---|---|---|---|---|---|---|
| 47 | Diethylenetriamine | Caprolactone | | 445 | 1:3 | 380 |
| 48 | Diethylanetriamine | Caprolactone | | 787 | 1:6 | 50 |
| 49 | Diethylenetriamine | Caprolactone | | 1129 | 1:9 | 30 |
| 50 | Diethanolamine | Azelaic Acid | | 257 | 2:1 | >100 |
| 51 | Diethanolamine | Adipic Acid | | 215 | 2:1 | >1000 |
| 52 | Diethanolamine | Adipic Acid | Caprolactone | 258 | (2:1):.38 | >1000 |
| 53 | Diethanolamine | Adipic Acid | Caprolactone | 301 | (2:1):.76 | 420 |
| 54 | Diethanolamine | Adipic Acid | Caprolactone | 344 | (2:1):1.14 | 220 |
| 55 | Diethanolamine | Isophthalic Acid | | 235 | 2:1 | 250 |

TABLE IV

| EXAMPLE | REACTANTS | | | MOLECULAR WEIGHT | MOLE RATIO | WATER THINNABILITY |
|---|---|---|---|---|---|---|
| 56 | THEIC | | | 261 | | >100 |
| 57 | THEIC | Caprolactone | | 489 | 1:2 | 35 |
| 58 | THEIC | Caprolactone | | 603 | 1:3 | 20 |
| 59 | THEIC | Caprolactone | | 718 | 1:4 | 15 |
| 60 | THEIC | Isophorone Diisocyanate | | 744 | 2:1 | 30 |
| 61 | THEIC | Azelaic Acid | | 670 | 2:1 | 30 |
| 62 | THEIC | Urea | | 304 | 1:1 | >200 |
| 63 | THEIC | Caprolactone | Dimethylol Urea | 1290 | (1:3):.5 | 15 |
| 64 | THEIC | Dimethylol Urea | | 606 | 2:1 | >200 |
| 65 | THEIC | Dimethylol Urea | Caprolactone | 640 | (2:1):.3 | >200 |
| 66 | THEIC | Dimethylol Urea | Caprolactone | 663 | (2:1):.5 | 150 |
| 67 | THEIC | Dimethylol Urea | Caprolactone | 686 | (2:1):.7 | 70 |
| 68 | THEIC | Azelaic Acid | Dimethylol Urea | 1424 | (2:1):1 | 25 |
| 69 | BHDH | | | 202 | | >200 |
| 70 | BHDH | Adipic Acid | | 598 | 2:1 | 70 |
| 71 | BHDH | Caprolactone | | 442 | 1:2 | 55 |
| 72 | BHDH | Caprolactone | | 328 | 1:1 | 80 |
| 73 | BHDH | Caprolactone | | 670 | 1:4 | 15 |
| 74 | BHDH | Caprolactone | BHDH | 341 | (1:2):1 | 55 |
| 75 | BHDH | Adipic Acid | | 544 | 2:1 | 70 |
| 76 | BHDH | Phthalic Acid | | 560 | 2:1 | 40 |
| 77 | BHDH | Isophthalic Acid | | 560 | 2:1 | 35 |
| 78 | BHDH | Adipic Acid | THEIC | 618 | 1:1:1 | 75 |
| 79 | BHDH | Isophorone Diisocyanate | | 704 | 2:1 | 30 |
| 80 | BHDH | Hexamethylene Diisocyanate | | 650 | 2:1 | 60 |
| 81 | BHDH | Trimethylhexamethylene Diisocyanate | | 684 | 2:1 | 30 |

TABLE IV-continued

| EXAMPLE | REACTANTS | | | MOLECULAR WEIGHT | MOLE RATIO | WATER THINNABILITY |
|---|---|---|---|---|---|---|
| 82 | BHDH | Adipic Acid | Dimethylol Urea | 1172 | (2:1):1 | 80 |

EXAMPLES 83 THROUGH 85

The following low molecular weight hydroxy-containing organic materials set forth in Table V were tested, and were found to be useful in combination with aminoplast resins to form useful coating compositions. The water thinnability is recorded in terms of parts of water per 100 parts of polyol.

TABLE V

| EXAMPLE | | | | MOLECULAR WEIGHT | MOLE RATIO | WATER THINNABILITY |
|---|---|---|---|---|---|---|
| 83 | Glycerol | Propylene Glycol | Dimethylol Urea | 252 | 1:1:1 | 100 |
| 84 | Ester Diol 204 | Dimethylol Urea | | 492 | 2:1 | 30 |
| 85 | Ester Diol 204 | Dimethylol Urea | Urea | 535 | (2:1):1 | 55 |

EXAMPLE 86

The following materials were charged to a reactor provided with a stirrer, a condenser, a thermometer, and a water trap:

| | Parts by Weight |
|---|---|
| Adipic acid | 2190 |
| Ethylene Glycol | 1860 |

Heating of the mixture was then started to remove water of condensation. After about 2 hours (temperature~143°C.), toluene was added for improved reflux. Approximately 630 milliliters of water were removed.

Approximately 910 parts of the resultant polyester (hereinafter Polyester A; hydroxyl value~230; molecular weight 480) were then removed from the reactor. The reactor was then again heated to remove water of condensation. After about 3½ hours (temperature~163°C.), the heat source was removed, and a vacuum was applied to remove the toluene. The temperature had dropped to about 140°C.

About 400 parts of the resultant polyester (hereinafter Polyester B; hydroxyl value~225; molecular weight 600) were then removed from the reactor. Heat was again applied to remove ethylene glycol for making higher molecular weight polyesters. Over the next 2½ hours (temperature~220°C.), and 200 milliliters of ethylene glycol were removed.

About 400 parts of the resultant polyester (hereinafter Polyester C; hydroxyl value~200; molecular weight=560) were then removed from the reactor. The remaining material in the reactor was heated to remove additional ethylene glycol. Over the next 2½ hours (temperature~225°C.), about 90 milliliters of ethylene glycol were removed. About 400 parts of the resultant polyester (hereinafter Polyester D; hydroxyl value~135; molecular weight 830) were then removed from the reactor. The reactor was subsequently purged of the reaction residue.

The four polyester polyols were then blended with an aminoplast resin and tested to determine their thinnabilities and whether they remain in solution at the various levels of water and the ethanol-water solvent blend used (ratio 20/80). The amounts of components are as set forth in the following table:

TABLE VI

| COMPONENTS | A | B | C | D |
|---|---|---|---|---|
| Parts by Weight of Polyester | 120 | 120 | 180 | 180 |
| Parts by Weight Hexakis(methoxymethyl) melamine (Cymel 300) | 80 | 80 | 120 | 120 |
| Parts water | 10 | 20 | 5 | 5 |
| | 20 | 20 | 10 | N.S. |
| | 30 | 40 | 15 | N.S. |
| Parts H₂O/Ethanol | 45 | 120 | 20 | 10 |
| | 65 | 140 | 25 | N.S. |

Except for the example wherein 10 parts of water were used with the Polyester A-Cymel 300 composition, all the compositions tabulated crystallized after about 2 days. When applied to steel panels and baked at 325°F. for 30 minutes, all the compositions tabulated produced hard, clear films.

EXAMPLE 87

The following materials were charged to a reactor provided with a stirrer, condenser, thermometer, and water trap:

| | Parts by Weight |
|---|---|
| Adipic acid | 2044 |
| Ethylene glycol | 868 |
| Propylene glycol | 1064 |

Heating of the mixture was then started to remove water of condensation. After about 2½ hours (temperaure~148°C.), toluene was added for better reflux. Heating was continued for about 15 hours. About 660 milliliters of water had been removed.

About 1700 parts of the resultant polyester (hereinafter Polyester A; hydroxyl value~225, molecular weight 500) were then removed from the reactor. A vacuum was then applied and toluene was removed. The reactor was then heated to remove additional water in the presence of toluene at 163°C. for 2½ hours. Approximately 15 milliliters of water had been removed from the reactor. The resultant polyester (hereinafter Polyester B; hydroxyl value~226; molecular weight 500) was then removed from the reactor.

The two polyester polyols were then blended with aminoplast resins and tested to determine there thinnabilities and whether they remain in solution at the various levels of water and water-ethanol solvent blend (ratio 80/20) used. The amounts of components are as set forth in the following table:

TABLE VII

|  | Polyester A | Polyester B |
|---|---|---|
| PBW Polyester | 120 | 120 |
| PBW Cymel 300 | 80 | 80 |
| Parts water | 10 | 20 |
|  | 20 | — |
| Parts water/ethanol | 20 | 20 |
|  | 30 | 30 |

After 1 week, all the solutions were still clear and homogeneous. When applied to steel panels and baked at 350°F. for 30 minutes, all the compositions produced hard and clear films.

EXAMPLE 88

The following materials were charged to a reactor provided with a stirrer, condenser, thermometer and water trap:

|  | Parts by Weight |
|---|---|
| Adipic Acid | 4380 |
| Ethylene glycol | 1860 |
| Propylene glycol | 2280 |

Heating of the mixture was then started to remove water of condensation. The temperature over the next hour and 45 minutes had reached about 152°C. Over the next 6 hours, about 373 milliliters of toluene were gradually added to improve reflux (average temperature~165°C.). The temperature (165°C.) was maintained for an additional 5 hours, after which the reactor was cooled to room temperature. In the total reaction time of about 13 hours, about 1500 milliliters of water had been removed. The polyester was then removed (hydroxyl value~370; molecular weight 303).

The polyester was then formulated as follows:

|  | Parts by Weight |
|---|---|
| Polyester | 48 |
| Hexakis(methoxymethyl)melamine (Cymel 300) | 32 |
| p-Toluenesulfonic acid | 0.2 |
| Water | 30 |

When applied to a steel substrate, the composition exhibited good wetting, flow and leveling.

A second formulation was prepared from the following blend:

|  | Parts by Weight |
|---|---|
| Polyester | 40 |
| Melamine formaldehyde resin (Resimine U980, from Monsanto) | 40 |
| p-Toluenesulfonic acid | 0.2 |
| Water | 40 |

When applied to a steel substrate, the composition exhibited good wetting, flow and leveling.

A third coating formulation was prepared from the following blend:

|  | Parts by Weight |
|---|---|
| Polyester | 25 |

| | Parts by Weight |
|---|---|
| Resimine 980 | 50 |
| p-Toluenesulfonic acid | 0.2 |
| Paste | 125 |
| Water | 34 |
| (85 percent solids) | |

The paste used comprised a blend of 100 parts of the above polyester and 400 parts of $TiO_2$. When applied to a steel substrate and heat cured, the composition provided a film having good film properties.

EXAMPLE 89

The following materials were charged to a reactor provided with a stirrer, condenser, thermometer, and water trap:

|  | Parts by Weight |
|---|---|
| Adipic acid | 1752 |
| Ethylene glycol | 744 |
| Diethylene glycol | 1272 |

Heating of the reaction mixture was then started, and 3.7 parts of p-toluene sulfonic acid were added for faster water distillation After about 2½ hours, the temperature had reached about 145°C. Over the next 2 hours, about 85 milliliters of cyclohexane were added to improve reflux (temperature 143°C.). The temperature was maintained for another hour, after which the reactor was cooled to room temperature. Approximately 460 milliliters of water had been removed.

The resultant polyester had an hydroxyl value of about 310 and a Gardner-Holdt viscosity of G-H. The product was found to be thinnable in γ–70 parts of water and more than 100 parts of an 80/20 blend of water and ethanol. When combined with Cymel 300 (60/40 weight ratio), the composition was found to be soluble in 45–50 parts of water and more than 100 parts of the solvent blend.

The polyesters were also tested for film appearance. The polyester was combined with Cymel 300, water and p-toluene sulfonic acid in the amounts set forth in the following Table. The compositions were applied to a steel substrate and were baked at 350°F. for 30 minutes. The film appearance is also set forth in the Table.

TABLE VIII

| Components | 1 | 2 | 3 |
|---|---|---|---|
| Polyester | 12 | 8 | 16 |
| Cymel 300 | 8 | 12 | 4 |
| Water | 4 | 4 | 4 |
| p-Toluenesulfonic acid | 0.048 | 0.048 | 0.048 |
| Film Appearance | Clear, but not very hard | Clear and hard | Soft, cheesy |

EXAMPLE 90

The following materials were charged to a reactor provided with a stirrer, condenser, and thermometer:

|  | Parts by Weight |
|---|---|
| Polyester of Example 3 | 2400 |

-continued

| | Parts by Weight |
|---|---|
| Urea | 1200 |

The mixture was gradually heated to 160°C. over a period of about 3 hours, after which about 170 milliliters of ammonia had been removed. 2246 parts of the resultant material were removed from the reactor and were heated at 60°C. under 15 millimeters Hg for 1 hour. The product was then heated at 80°C. for about 3 hours under 15 millimeters Hg.

The resultant product was found to have a water thinnability of 35 parts water per 100 parts of resin. The product had an amine equivalent of about 890, an hydroxyl value of about 375 and a Gardner-Holdt viscosity of Z9-Z10.

A coating composition was then prepared from the following:

| | Parts by Weight |
|---|---|
| Reaction product above | 25 |
| Cymel 303 | 25 |
| Catalyst | 2 |
| Water | 19 |

The catalyst used consisted of a blend of 7.8 parts of paratoluene sulfonic acid (96 percent), 4.50 parts of dimethylethanolamine and 138 parts of water.

When applied to a steel substrate and baked at 350°F. for 20 minutes, a unique film resulted. The film exhibited 100 percent adhesion, when subjected to a cross-hatch adhesion test.

EXAMPLE 91

Ethylene carbonate (2200 parts) was charged to a reactor. Over the next hour, diethylene triamine was gradually added thereto (a total of about 1288 parts), while maintaining the temperature at about 45°C. by cooling. After an additional hour, there was no apparent exotherm, and the temperature had stabilized at 50°C. After 30 minutes, the resin had crystallized and the temperature was increased to 100°C. to melt the product.

A portion of the product was removed (1820 parts) and $\epsilon$-caprolactone (1145 parts) was added thereto. After about 45 minutes at 100°C., 1.5 parts of tetrapropyl titanate (TPT) were added, and the temperature was held until all the components had melted. All the components had melted in about 20 minutes. Thereafter, the mixture was heated at 150°C. for 7 hours.

The resultant product had a water thinnability of 85–90 parts water per 100 parts of resin, an hydroxyl value of 150, a percent solids at 150°F. of 78.9, and a Gardner-Holdt viscosity of Z1-Z2.

The product was then blended as follows:

| | Parts by Weight |
|---|---|
| Product above | 12 |
| Melamine-formaldehyde resin (MM83, Rohm and Haas) | 15 |
| p-Toluenesulfonic acid | 0.048 |
| Water | 4 |

When applied to a steel substrate and baked at 350°F. for 20 minutes, a hard, clear film resulted.

EXAMPLE 92

Hydroxyethyl hydroxypropyl carbamate, $\epsilon$-caprolactone, and TPT. were mixed in the parts by weight set forth in the following Table. In each instance, the components were mixed and held at 130°C. for 21 hours. The products had the water thinnabilities shown in the Table.

TABLE IX

| | A | B | C | D | E |
|---|---|---|---|---|---|
| Carbamate | 17.5 | 150.0 | 150.0 | 140.0 | 130.0 |
| Caprolactone | 17.5 | 30.0 | 45.0 | 56.0 | 65.0 |
| TPT | 0.1 | 0.1 | 0.1 | 0.1 | 0.1 |
| Water Thinnability | >500 | >500 | 350 | 190 | 160 |

The product of D was then formulated into a coating composition as follows:

| | Parts by Weight |
|---|---|
| Product of D above | 25 |
| Resimine U 980 | 25 |
| Catalyst (same as Example 90) | 2 |
| Water | 8 |

When applied to a steel substrate, the composition exhibited good wetting. Upon baking at 350°F. for 20 minutes, a good cured non-yellowing film resulted. The film passed the Conical Mandrel test (0.5–0.7 mil) and exhibited 100 percent adhesion when subjected to the cross-hatch adhesion test.

EXAMPLE 93

Tris(hydroxyethyl)isocyanurate (522 parts) was charged to a reactor. Thereafter, 226 parts of $\epsilon$-caprolactone were added and the temperature was increased to and held at 170°C. After about 40 minutes, 0.2 part of TPT titanate was added. The temperature was maintained at 170°C. for an additional 30 minutes, after which the resultant product was poured out in four portions of 187 parts each. The following amounts of caprolactone were added to each portion and the resultant blends were heated at 150°C. for 2 hours.

| | Added Caprolactone (Parts by Weight) |
|---|---|
| A | None |
| B | 56.5 |
| C | 113.0 |
| D | 169.5 |

All four compositions had water thinnabilities in excess of 100 parts of water per 100 parts of resin.

To 142.6 parts of D were added 45.2 parts of ε-caprolactone. The mixture was held at 300°F. for 2 hours. This product is hereinafter referred to as E.

To another 142.6 parts of D were added 90.4 parts of ε-caprolactone. The mixture was held at 300°F. for 2 hours. This product is hereinafter referred to as F.

The six water-thinnable compositions were then blended into coating compositions as set forth in the following Table. The compositions were applied to a cold rolled steel substrate and were baked at 250°F. for 45 minutes. The resultant films were then tested for both forward and reverse impact with the results set forth in the following Table.

TABLE X

|  | A | B | C | D | E | F |
|---|---|---|---|---|---|---|
| Parts of resin | 6.2 | 8.1 | 10.0 | 11.9 | 15.65 | 19.45 |
| Cymel 303 | 8.0 | 8.0 | 8.0 | 8.0 | 8.0 | 8.0 |
| p-Toluenesulfonic acid | 0.028 | 0.032 | 0.04 | 0.046 | 0.046 | 0.054 |
| Water | 1.0 | 0.5 | 0 | 0 | 0 | 0 |
| Forward Impact | 80 | 70 | 90 | 60 | >160 | >160 |
| Reverse Impact (inch pounds) | 60 | 80 | 60 | 80 | >160 | >160 |

EXAMPLE 94

Diethylene triamine, ε-caprolactone and TPT were charged to a reactor in the amounts set forth in the following table.

In each instance, the components were mixed and held at 130°C. for 12 hours. The water thinnabilities of each composition are as set forth in the Table.

TABLE XI

|  | A | B | C | D |
|---|---|---|---|---|
| Diethylene triamine | 170 | 102 | 68 | 51 |
| ε-caprolactone | 570 | 684 | 684 | 684 |
| TPT | 0.37 | 0.39 | 0.38 | 0.37 |
| Water thinnability | 370–380 | 40–50 | 20–30 | <10 |

The product B was formulated into a coating composition as follows:

|  | Parts by Weight |
|---|---|
| Product of B (above) | 12 |
| MM-83 | 15 |
| p-Toluenesulfonic acid | 0.48 |

When applied to a steel substrate and baked at 350°F. for 20 minutes, a hard, clear film resulted.

EXAMPLE 95

The following materials were charged to a reactor:

|  | Parts by Weight |
|---|---|
| Bis(hydroxyethyl)dimethylhydantoin (BHDH) | 214 |
| Hexamethylene diisocyanate | 84 |

The materials were mixed together at 120°C. The mixture was then allowed to exotherm to 142°C. When the exotherm was complete, the mixture was held at 250°C. for 6 hours, after which time infrared analysis showed no unreacted isocyanate groups.

The resultant product had a thinnability of 55–60 parts of water per 100 parts of resin (Gardner-Holdt viscosity of G-H) and 120–125 parts of an 80/20 blend of water and ethanol (Gardner-Holdt viscosity of A-) per 100 parts resin. The product had an hydroxyl value of 138 at 98.76 percent solids.

The product was then formuated into a coating composition as follows:

|  | Parts by Weight |
|---|---|
| Product above | 14.9 |
| Cymel 303 | 8.0 |
| Water | 6.0 |
| p-Toluenesulfonic acid | 0.046 |

When applied to a steel substrate by spraying, and cured at 300°F. for 30 minutes, a hard, clear film resulted.

EXAMPLE 96

The following materials were mixed together at 120°F.:

|  | Parts by Weight |
|---|---|
| BHDH | 214 |
| Trimethylhexamethylene diisocyanate | 105 |

The mixture was allowed to exotherm to 157°C., after which it was held at 250°C. for 6 hours.

The resultant product had a thinnability of 25–30 parts of water per 100 parts of resin (Gardner-Holdt viscosity of Y), and 40–45 parts of an 80/20 blend of water and ethanol per 100 parts of resin. The product had an hydroxyl value of 162 at 98.25 percent solids (150°F.).

The product was then formulated into a coating composition as follows:

|  | Parts by Weight |
|---|---|
| Product above | 15.95 |
| Cymel 303 | 8.0 |
| Water | 6.0 |
| p-Toluenesulfonic acid | 0.048 |

When applied to a steel substrate by spraying, and cured at 350°F. for 30 minutes, a hard, clear film resulted.

EXAMPLE 97

N,N,O-tris(hydroxyethyl)glycolamide and ε-caprolactone were blended together in the amounts shown in the following table. Each composition was heated at 250°F. for 6 hours. The percent solids in the reaction product were as set forth in the Table.

TABLE XI

|  | A | B | C | D |
|---|---|---|---|---|
| Glycolamide | 331.2 | 207.0 | 207.0 | 207.0 |

TABLE XI-continued

|  | A | B | C | D |
|---|---|---|---|---|
| Caprolactone | 91.2 | 114.0 | 171.0 | 228.0 |
| Percent Solids (105°F.) | 94.6 | 93.5 | 96.3 | 94.7 |

The product of B, having an hydroxyl value of 325, an amine equivalent of 1623 and a Gardner-Holdt viscosity of Z4-Z5, was formulated into a coating composition as follows:

|  | Parts by Weight |
|---|---|
| Product of B above | 25 |
| Resimine U 980 | 25 |
| p-Toluenesulfonic acid | 0.4 |
| Water | 10 |

When applied to a steel substrate and heated at 350°F. for 20 minutes, a hard film resulted. The film yellowed considerably, such yellowing being attributable to the high amine content.

EXAMPLE 98

The following materials as set forth in the Table were mixed well and were held at 130°C. for 14.5 hours. The resultant products had the molecular weights, hydroxyl values, amine equivalents, and Gardner-Holdt viscosities as set forth in the Table.

TABLE XII

|  | A | B |
|---|---|---|
| $(HOC_2H_4)_2-N-\overset{O}{\underset{\|}{C}}-O-CH_2-CH_2-OH$ | 200 | 150 |
| ε-caprolactone | 160 | 225 |
| TPT | 0.18 | 0.19 |
| Molecular weight | 347 | 489 |
| OH value | 464 | 342 |
| Amine equivalent | 13,314 | 14,808 |
| Viscosity | G-H | J-K |
| Water thinnability | 90–100 | 40–50 |

EXAMPLE 99

The materials set forth in the following Table were mixed well and heated at 120°C. for 1 hour, after which they were heated at 150°C. for 3 hours and 45 minutes. Gel permeation chromatography analysis showed that the reaction was complete. The products had the water thinnability as set forth in the Table. When combined with aminoplast resins, unique coating compositions resulted.

TABLE XIII

|  | A | B | C | D |
|---|---|---|---|---|
| Diethanolamine | 105 | 105 | 105 | 105 |
| ε-Caprolactone | 228 | 256 | 285 | 342 |
| TPT | 0.16 | 0.18 | 0.20 | 0.22 |
| Water thinnability | 220–240 | 170–180 | 120–130 | 70–80 |

EXAMPLE 100

The materials set forth in the following table were charged to a reactor. Compositions A and B were heated at 300°F. for 4 hours, while Composition C was heated at 340°F. for 4 hours. The water thinnabilities of each composition were as set forth in the following Table.

TABLE XIV

|  | A | B | C |
|---|---|---|---|
| BHDH | 107.0 | 107.0 | 107.0 |
| ε-Caprolactone | 113.0 | 226.0 | 56.5 |
| TPT | 0.1 | 0.1 | 0.1 |
| Water thinnability | 35–40 | 10–15 | 75–80 |

To 22 parts of the product of C above were added 107 parts of BHDH. The two were thoroughly mixed. The resultant product (hereinafter D) had a water thinnability of 50–55.

The above water-thinnable resins were then formulated into coating compositions as follows:

|  | A' | B' | C' | D' |
|---|---|---|---|---|
| Parts resin | 11.0 | 11.3 | 7.6 | 16.4 |
| Cymel 303 | 8.0 | 5.33 | 8.0 | 8.0 |
| p-Toluenesulfonic acid | 0.038 | 0.032 | 0.030 | 0.048 |

The compositions were drawn with a 3 mil drawbar over a steel substrate and were baked at 250°F. for 45 minutes. All the films formed were hard and clear.

The product of C above (not C') was formulated as set forth in the following Table and was tested for pencil hardness, direct and reverse impact and salt spray resistance (ASTM B-117). The results are in the following table:

TABLE XV

|  | C'' | C''' |
|---|---|---|
| Parts of C (above) | 30.7 | 25.0 |
| Cymel 303 | 32.0 | 15.0 |
| p-Toluenesulfonic acid | 0.128 | 0.1 |
| Pigment paste | – | 85.3 |
| Water | 38.0 | 7.0 |
| Cure: |  |  |
| 20 minutes at 350°F. |  |  |
| Pencil hardness | 4H | 4H |
| Direct impact (inch pounds) | 70 | 40 |
| Reverse impact (inch pounds) | 10 | 10 |
| Salt spray resistance | 105 hrs. >¼" scribe creepage | 168 hours failed |
| 45 minutes at 250°F. |  |  |
| Pencil hardness | 3H | Not tested |
| Direct impact (inch pounds) | 160 | Not tested |
| Reverse impact (inch pounds) | 160 | Not tested |
| Salt spray resistance | 105 hrs. ⅛" scribe creepage | Not tested |

The pigment paste used consisted of 1800 parts of TiO$_2$, 360 parts of Cymel 303, 45 parts of Triton X-100 (an emulsifier from Rohm and Haas), 45 parts of Tamol 731 (a surface active agent from Rohm and Haas), 15 parts of NAPCO JMY (an anti-foaming agent, Napco Division of Diamond Chemical Co.) and 735 parts of water.

EXAMPLE 101

The following materials were charged to a reactor provided with a stirrer, condenser, thermometer and water trap:

| | Parts by Weight |
|---|---|
| BHDH | 2568.0 |
| Adipic acid | 876.0 |
| p-Toluenesulfonic acid | 3.44 |

Over the next 5 hours, the temperature was raised to about 180°C. while about 145 milliliters of toluene were gradually added to improve reflux. Heating at about 180°C. was continued for about 6 more hours, after which the reaction mixture was allowed to cool to room temperature. Over the 11 hours hours of reaction time, about 214 milliliters of water had been removed.

Heat and vacuum were then applied to remove the toluene from the system. After about 1½ hours at 100°C., the toluene had been removed and the mixture was then cooled to room temperature.

About 2730 parts of the resultant product were removed from the reactor, and 300 parts of water were added thereto for a total solids content of 90 percent. The product had an hydroxyl value of 135 and a Gardner-Holdt viscosity of Y.

The composition was then formulated into a coating as follows:

| | Parts by Weight |
|---|---|
| Product above | 15.0 |
| Cymel 303 | 8.0 |
| p-Toluenesulfonic acid | 0.046 |

When drawn on a steel using a 3 mil drawbar, and baked at 250°F. for 45 minutes, a film havng a direct and reverse impact of 160 inch pounds and a pencil hardness of F resulted.

EXAMPLE 102

The following materials were charged to a reactor provided with a stirrer, thermometer, condenser, and water trap:

| | Parts by Weight |
|---|---|
| BHDH | 1926.0 |
| Isophthalic acid | 747.0 |
| p-Toluenesulfonic acid | 2.67 |

Over the next 5½ hours, the temperature was raised to about 195°C., while 60 milliliters of toluene were added to improve reflux. The temperature was maintained at about 190°C. for an additional 6½ hours, after which a total of about 158 milliliters of water had been removed.

The product was then cooled to room temperature and heated under vacuum conditions to about 120°C. to remove the toluene. After about 2½hours, the toluene had been removed.

The product was then formulated into a coating composition as follows:

| | Parts by Weight |
|---|---|
| Product above | 16.45 |
| Cymel 303 | 8.0 |
| p-Toluenesulfonic acid | 0.05 |
| Water | 1.0 |

The composition was drawn on a cold rolled steel substrate and was baked at 250°F. for 45 minutes. The resultant film had a forward impact of 70 inch pounds and a reverse impact of 80 inch pounds.

EXAMPLE 103

The following materials were charged to a reactor provided with a stirrer, condenser, thermometer and water trap:

| | Parts by Weight |
|---|---|
| BHDH | 2140.0 |
| Hexahydrophthalic anhydride | 770.0 |
| p-Toluenesulfonic acid | 2.9 |

The temperature was raised to about 185°C. and over the next 2 hours, toluene was added to improve reflux. The temperature was maintained at about 190°C. for an additional 10 hours, after which a total of about 90 milliliters of water had been removed.

The product was then cooled to room temperature, after which heat under vacuum was applied to remove the toluene. After about 1½ hours at 125°C., the toluene had been removed.

To the resultant product were added 580 parts of water for an 80 percent solids solution. This product had an hydroxyl value of 100 and a Gardner-Holdt viscosity of V.

The 80 percent solids solution was then formulated into a coating composition as follows:

| | Parts by Weight |
|---|---|
| Product above | 17.5 |
| Cymel 303 | 8.0 |
| p-Toluenesulfonic acid | 0.052 |

The composition was drawn on a cold rolled steel panel with a 3 mil draw bar and was baked at 250°F. for 45 minutes. The resultant film had a forward impact of 50 inch pounds and a reverse impact of 70 inch pounds.

EXAMPLE 104

The following materials were charged to a reactor provided with a stirrer, condenser, thermometer, and water trap:

| | Parts by Weight |
|---|---|
| Tris(hydroxyethyl)isocyanurate | 1044.0 |
| Adipic acid | 292.0 |
| p-Toluenesulfonic acid | 1.34 |

The temperature was raised to about 165°C. over the next hour. Over the next 9 hours, the temperature was maintained at around 165°C., while toluene was gradually added to improve reflux. The temperature was maintained at about 160°C. for an additional 3 hours and was then allowed to drop to room temperature. A total of about 72 milliliters of water had been removed.

The product was then heated to about 110°C. and a vacuum was applied to remove the toluene.

To 100 parts of the resultant product were added 180 parts of water for a total solids content of 85 percent. This product had an hydroxyl value of about 223 and a Gardner-Holdt viscosity of Y-Z.

The product was then formulated into a coating composition as follows:

| | Parts by Weight |
|---|---|
| Product above | 9.35 |
| Cymel 303 | 8.0 |
| p-Toluenesulfonic acid | 0.034 |
| Water | 0.5 |

The composition was drawn on a cold rolled steel substrate, and was baked at 250°F. for 45 minutes. The resultant film had a direct impact of 160 inch pounds, and a reverse impact of 140 inch pounds.

EXAMPLE 105

Propylene glycol (472 parts) and Esterdiol 204 (1632 parts) were charged to a reactor provided with a steam jacket, a vacuum take-off adaptor, a stirrer and a thermometer. Both heat and vacuum were applied. When the temperature had reached 100°C. and when the pressure in the reactor reached 80 mm Hg (after 1 hour), the vacuum was turned off, and 0.4 part of dibutyltin dilaurate were added. Hexamethylene diisocyanate (1056 parts) was then gradually added to the reaction mixture while the temperature was maintained at about 90°C. The addition was complete after about 1 hour. The reaction mixture was held at 90°C. for another 2 hours.

The resultant product had an hydroxyl value of about 270, a Gardner-Holdt viscosity of Z8 and a water thinnability of 15 parts of water per 100 parts of resin.

EXAMPLE 106

The following materials were blended together:

| | Parts by Weight |
|---|---|
| Hydroxyethyl acrylate | 10.0 |
| Cymel 300 | 5.0 |
| p-Toluene sulfonic acid | 0.1 |
| Benzoyl peroxide | 0.1 |
| Water | 2.0 |

The mixture was applied to a steel substrate by spraying and was baked at 250°F. for 30 minutes. A clear, hard film resulted.

EXAMPLE 107

The following materials were blended together:

| | Parts by Weight |
|---|---|
| Propylene glycol | 30 |
| Poly(oxytetramethylene)glycol (Mol wt. 620) | 30 |
| Water | 10 |
| MM-83 | 37.5 |

A 3 mil wet film was then drawn on a clean steel substrate. After baking at 280°F. for about 1 hour, a clear, hard film resulted.

According to the provisions of the patent statutes, there are described above the invention and what are now considered to be its best embodiments. However, within the scope of the appended claims, it is to be understood that the invention can be practiced otherwise than as specifically described.

I claim:

1. An aqueous, high solids coating composition substantially devoid of salt solubilizing groups comprising:
   A. a vehicle blend comprising:
      1. from about 20 to about 80 percent by weight of a hydroxyl-containing organic material, said organic material having a molecular weight of 1000 or less and being selected from the group consisting of non-nitrogen containing polyols, amide group containing polyols, hydroxyl-containing acrylates, and hydroxyl-containing methacrylates, wherein said organic material contains no more than two alkylene oxide groups per hydroxyl group and has a room temperature water thinnability of 3 or more parts of water per 100 parts of organic material, said organic material being further characterized by an average hydroxyl equivalent weight between about 40 and about 500 and an oxygen plus nitrogen to carbon ratio of not less than 1:5; and
      2. from about 80 to about 20 percent by weight of an aminoplast resin; and
   B. aqueous solvent, wherein at least 10 percent by weight of the solvent is water, said coating composition characterized by a solids content of at least about 70 percent.

2. The composition of claim 1, wherein at least 50 percent by weight of the solvent is water.

3. The composition of claim 2, wherein said organic material is a non-nitrogen containing polyol, said non-nitrogen containing polyol being selected from the group consisting of diols, triols and higher alcohols, polyester polyol oligomers, and polyester polyol oligomers containing one or two alkylene oxide groups per hydroxyl group.

4. The composition of claim 3, wherein said non-nitrogen containing polyol has an average hydroxyl equivalent weight of 40 or less, and wherein the composition additionally contains (D) a polymeric polyol having a hydroxyl equivalent weight of at least about 200.

5. The composition of claim 3, wherein said non-nitrogen containing polyol is a polyester polyol oligomer having a molecular weight of 800 or less.

6. The composition of claim 3, wherein said non-nitrogen containing polyol is a polyester polyol oligomer containing one or two alkylene oxide groups per hydroxyl group and having a molecular weight of 1000 or less.

7. The composition of claim 2, wherein said organic material is a amide group-containing polyol, said amide group-containing polyol being selected from the group consisting of polyurethane polyol oligomers, cyclic nitrogen polyols, polyurea polyol oligomers and polyamide polyol oligomers, said amide group-containing polyol having at least one group of the formula:

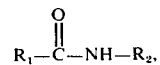

wherein $R_1$ is selected from the group consisting of $-CH_2-$, $>CH-$,

—O—, —NH$_2$—, N—, and —NH—, and wherein R$_2$ is selected from the group consisting of —CH$_2$—, >CH—,

—O—,

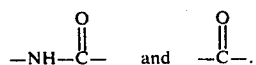

8. The composition of claim 7, wherein said nitrogen-containing polyol is a polyurethane polyol oligomer, said polyurethane polyol oligomer having no more than 4 urethane groups per molecule.

9. The composition of claim 8, wherein said polyurethane polyol oligomer has a molecular weight of 800 or less.

10. The composition of claim 8, wherein said polyurethane polyol oligomer has a molecular weight of 1000 or less, and contains one or two alkylene oxide groups per hydroxyl group.

11. The composition of claim 7, wherein said amide group-containing polyol is a cyclic nitrogen-containing polyol.

12. The composition of claim 11, wherein said cyclic nitrogen-containing polyol is selected from the group consisting of tris(hydroxyethyl)isocyanurate and N,N'-bis(hydroxyethyl)dimethyl hydantoin.

13. The composition of claim 11, wherein said cyclic nitrogen-containing polyol is reacted with an organic diisocyanate to form an hydroxyl-containing urethane reaction product.

14. The composition of claim 11, wherein said cyclic nitrogen-containing polyol is reacted with an organic diacid to form a hydroxyl-containing ester product.

15. The composition of claim 11, wherein said cyclic nitrogen-containing polyol has a molecular weight of 800 or less.

16. The composition of claim 11 wherein said cyclic nitrogen-containing polyol has a molecular weight of 1000 or less and contains one or two alkylene oxide groups per hydroxyl group.

17. The composition of claim 2, further including (D) a polymeric polyol having an average hydroxyl equivalent weight of at least about 500.

18. The composition of claim 2, wherein said organic material is reacted with a lactone in order to decrease the water thinnability thereof.

19. The composition of claim 2, wherein said organic material is reacted with urea or a ureido compound in order to increase the water thinnability thereof.

* * * * *

UNITED STATES PATENT OFFICE
CERTIFICATE OF CORRECTION

PATENT NO. : 3,959,201
DATED : May 25, 1976
INVENTOR(S) : Wen-Hsuan Chang

It is certified that error appears in the above-identified patent and that said Letters Patent are hereby corrected as shown below:

Column 3, line 41, "sine" should be --since--.

Column 18, line 38, "y-70" should be --65-70--.

Column 21, after line 47, insert --Water  5.0--.

Column 24, line 18, "107" should be --10.7--.

Column 25, line 34, "havng" should be --having--.

Signed and Sealed this

Fourteenth Day of September 1976

[SEAL]

Attest:

RUTH C. MASON
*Attesting Officer*

C. MARSHALL DANN
*Commissioner of Patents and Trademarks*